United States Patent
Sanz-Pastor et al.

(10) Patent No.: US 6,906,729 B1
(45) Date of Patent: Jun. 14, 2005

(54) SYSTEM AND METHOD FOR ANTIALIASING OBJECTS

(75) Inventors: Ignacio Sanz-Pastor, San Francisco, CA (US); David L. Morgan, III, Redwood City, CA (US)

(73) Assignee: Aechelon Technology, Inc., San Carlos, CA (US)

( * ) Notice: Subject to any disclaimer, the term of this patent is extended or adjusted under 35 U.S.C. 154(b) by 0 days.

(21) Appl. No.: 10/102,082

(22) Filed: Mar. 19, 2002

(51) Int. Cl.[7] .......................... G09G 5/00; G08K 9/40
(52) U.S. Cl. ...................................... 345/611; 382/269
(58) Field of Search ................................ 345/418, 419, 345/422, 424, 426, 427, 473, 611; 382/269, 299

(56) References Cited

U.S. PATENT DOCUMENTS

| | | | |
|---|---|---|---|
| 6,072,500 A | | 6/2000 | Foran et al. |
| 6,433,790 B1 | * | 8/2002 | Taylor et al. ............... 345/611 |
| 2002/0051003 A1 | * | 5/2002 | Cosman et al. ............. 345/611 |
| 2003/0043169 A1 | * | 3/2003 | Hunter ....................... 345/611 |

OTHER PUBLICATIONS

Fuchs et al., "Fast Spheres, Shadows, Textures, Transparencies, and Image Enhancements In Pixel–Planes," Proceedings of the 12th Annual Conference on Computer Graphics and Interactive Techniques, International Conference on Computer Graphics and Interactive Techniques, vol. 19, No. 3, Jul. 1985, pp. 111–120.

Haeberli et al., "The Accumulation Buffer: Hardware Support for High–Quality Rendering," Computer Graphics, vol. 24, No. 4, Aug. 1990, pp. 309–318.

Blythe, "OpenGL Graphics Standards Specification," [online]. Mar. 29, 1997 [retrieved on Feb. 23, 2004]. Retrieved from the Internet: <URL: http://www.opengl.org.documentation/specs/version1.1/glspec1.1/node51.html>, 2 pages.

Wright, Jr., et al., "Chapter 3: Viewing," OpenGL Programming Guide, Second Edition, published Dec. 1999, 12 pages.

* cited by examiner

Primary Examiner—Matthew C. Bella
Assistant Examiner—Aaron M. Richer
(74) Attorney, Agent, or Firm—Fenwick & West LLP

(57) ABSTRACT

Object in a scene are antialiased individually in an object-specific manner, according to the type of object in question. One type of object is antialiased using a multipass screen-space jitter technique, where multiple instances of each antialiased object are render and blended together, with a small displacement in screen space coordinates for each copys. Another type of object is antialiased using a single-pass growth antialasiang technique, where the actual rendered geometry is changed in real time in accordance with distance and angle to minimize aliasing artifacts. Most objects are preferably antialiased using the first technique, with the second technique being most suited to high contrast, long and thin objects, such as runway lines or power line 8 Claims, 6 Drawing Sheets Vertex form Parametric Form $V0 = C0 + S \cdot o0$
$V1 = C1 + S \cdot o1$
$V2 = C2 + S \cdot o2$
$V3 = C3 + S \cdot o3$

SYSTEM AND METHOD FOR ANTIALIASING OBJECTS

BACKGROUND OF THE INVENTION

1. Field of the Invention

This invention relates to the field of computer graphics, specifically real-time rendering and anti-aliasing of three-dimensional objects.

2. Description of the Related Art

Real-time computer graphics in its origins used vector displays, on which images were drawn by precisely guiding the path and intensity of an electron beam (emitted by an electron gun) across a phosphor screen to produce points, lines, curves, etc. While these vector displays were very limiting and are no longer in wide use, the shapes drawn always had very smooth edges because the electron beam was manipulated according to the exact equation describing the line or curve being drawn, onto a uniform (gridless) phosphor screen, resulting in little to no quantization of the signal.

Later, when memory became inexpensive enough for the first frame buffers, real-time computer graphics moved onto raster displays. Raster displays, like television screens, are organized into picture elements (pixels) arrayed upon a uniform grid across the screen. Rather than trace out the specific equations of geometric constructs, the electron gun moves across each row of pixels until the entire screen has been scanned. The image on the screen is created by varying the intensity of the electron beam as it strikes each pixel. Color displays were later made possible by depositing three overlapping grids of phosphors (red, green, blue) on the screen, with a slight offset applied to each grid to group the red, green, and blue subpixels into pixels. Three electron guns are employed to light the phosphors respectively.

In addition to enabling color display, raster displays also enabled rendering of filled (as opposed to wireframe) surfaces, which, with the addition of real-time lighting, texture mapping, and other rendering techniques eventually led to more realistic interactive experiences. Unfortunately, the smooth lines were replaced by "baggy" lines and polygon edges which flicker and swim when animated. These visual artifacts caused by the quantization of curves and surfaces onto a grid are referred to aliasing. They are caused during the process of computing pixel coverage for a surface. One conventional way of deciding whether to light a pixel is to determine whether the pixel is covered by a polygon, e.g. by selecting pixels whose centers lie within the boundaries of the polygon, and lighting only the covered pixels. Another way is to light each pixel containing any part of the polygon. Aliasing results from each of these methods. For example, FIG. 1A illustrates a line 102a passing through a grid 104, wherein each square of the grid represents a pixel. FIG. 1B illustrates how the line 102b would be rendered if each pixel through which the line 102a passes is lit The aliasing of line 102b in FIG. 1B is clear, resulting in a number of jagged edges that make the line look unnatural. Aliasing is a problem that is well known in the art of computer graphics.

Many approaches have been developed for eliminating aliasing of objects, i.e. antialiasing, most of which rely upon coloring pixels proportionally to the amount by which a surface overlaps that pixeL That proportion is encoded using a coverage value that blends fragments generated by each primitive with the preexisting pixel color in the frame buffer. Some approaches use primitive antialiasing, in which each primitive (e.g. line, triangle, point), is antialiased independently as it is drawn, and then the resulting pixels are combined whole to produce the final image. This technique is most widely used as line antialiasing for CAD applications. Primitive antialiasing is problematic for solid surfaces because it is order-dependent. For example, suppose the frame buffer is cleared to black and then two polygons (red in the foreground and blue in the background) are drawn such that they partially overlap, and primitive antialiasing is used. Also, assume hidden surface removal is employed. If the foreground polygon is drawn after the background polygon, the edges appear as expected, with edges of the blue background polygon fading into the black void, the overlapping edges of the red foreground polygon fading into blue, and the non-overlapping edges of the red foreground polygon fading into the black void. If, however the polygons are drawn in the reverse order, with the background drawn after the foreground, then the overlapping edges of the red foreground polygon will fade from red to black, which is in error and will destroy any benefits gained from antialiasing.

As a result of this order-dependent phenomenon, scenes employing conventional primitive antialiasing must be sorted such that polygons are drawn from back to front, which is excessively computationally intensive for scenes of reasonable complexity. For this reason, full-scene antialiasing (FSAA) was developed. Full-scene antialiasing techniques generally divide each pixel into a plurality of samples, which are stored separately in the frame buffer, and then combined when the frame buffer is read by the digital-to-analog converter (DAC) for display. The predominant FSAA technique is called Multisampling, and is described for example in U.S. Pat. No. 6,072,500. Multisampling is not without a performance impact, however. Frame-buffer memory bandwidth is generally the limiting factor in real-time rendering performance, and because N-times as many samples as pixels must be rendered, nearly N-times the bandwidth is required. Because of memory coherency optimizations, overall performance is not generally degraded by a factor of N, but FSAA nonetheless has a high cost, particularly at high resolutions.

Also, because aliasing occurs principally at the edges of surfaces, only a tiny fraction of the pixels in some scenes may exhibit aliasing. Scenes comprised primarily of large solid (as opposed to wireframe) surfaces exhibit this characteristic. For such scenes, FSAA might be considered overkill. It is desirable to apply antialiasing selectively, where it is needed most, based on the requirements of the application and perceptual factors such as the degree of contrast across an edge. Also, in systems capable of FSAA, it is desirable to enhance the antialiasing on certain critical objects. For example, in a flight simulator, it is important to be able to identify other aircraft at a distance, when they are made very small by projection. Aliasing makes this identification very difficult because it distorts the shape of the aircraft and causes it to shimmer and flicker as it moves across the screen. In situations such as this, it is desirable to apply the maximum degree of antialiasing possible to the critical object, even though it may not be desirable to apply maximum antialiasing to the whole scene, because of performance considerations.

For some pathological object configurations, the degree of aliasing vastly exceeds the ability of existing real-time antialiasing technology. In general, high contrast, long and thin objects are not easy to antialias in real time. One example of this phenomenon is that of runway lines, as might be seen within a flight simulator. It is important for a pilot to be able to recognize runway markings at a distance—however, runway lines are long and thin, which results in sub-pixel-width polygons (as projected into screen-space), which are the most difficult to antialias; and runway lines are generally very high contrast, such as white lines on a black asphalt tarmac, which makes the aliasing extremely visible, and therefore disagreeable. Thus, a better solution for antialiasing runway lines is needed.

Accordingly, there is a need for a system and method for improved antialiasing of objects in a scene.

SUMMARY OF THE INVENTION

The present invention includes a system and method for antialiasing, by which objects in a scene are antialiased individually. This antialiasing is performed in an object-specific manner, according to the type of object in question. One type of object is antialiased using a multipass screen-space jitter technique, where multiple instances of each antialiased object are rendered and blended together, with a small displacement in screen space coordinates for each copy. Another type of object is antialiased using a single-pass growth antialiasing technique, where the actual rendered geometry is changed in real time in accordance with distance and angle to minimize aliasing artifacts. Most objects are preferably antialiased using the first technique, with the second technique being most suited to high contrast, long and thin objects, such as runway lines or power line cables.

The multipass screen-space jitter technique renders the object in question (which may be a hierarchical object comprised of other sub-objects) multiple times, making a primary pass and zero or more secondary passes. The secondary passes are preferably rendered with a user-specified screen-space offset. All passes are preferably rendered with a transparency factor determined by other factors such as distance from the eye point. The primary pass, however, is rendered with less transparency than the subsequent passes, preferably as controlled by a user-specified maximum transparency parameter. This technique achieves antialiasing by blending the edges of the object with the background without requiring the rendered primitives to be ordered front to back, and can work for an entire scene or on a per object basis The single-pass growth antialiasing technique addresses the pathological case of runway lines and power line cables, and more generally of high contrast long, thin objects that can cover less than an entire pixel width due to their proportions. This technique preferably involves storing the runway lines in a format such that each vertex contains a center point and an offset vector that together specify the object-space position of each vertex. A per-vertex texture coordinate may also be supplied. Because runway lines are generally flat, a per-object normal vector may be supplied for lighting calculations. The objects are rendered using a scaling factor and transparency factor, which are derived from other factors such as distance and angle of incidence. Other factors that can affect the processing are contrast measurements, line thickness, visibility, and screen resolution. As the lines become thinner (due to distance or view angle), the lines are rendered thicker and with more transparency, which serves to increase the screen-space footprint beyond the 1-pixel threshold and reduce the brightness (contrast).

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
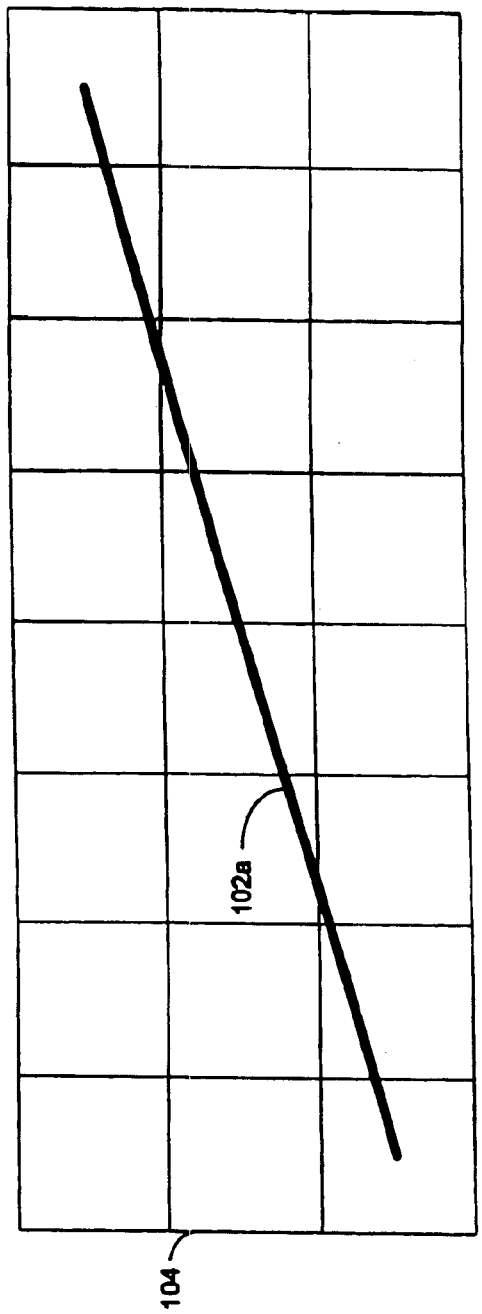
FIG. 1 illustrates an example of how aliasing occurs in a computer graphics environment.
Figure 1B:
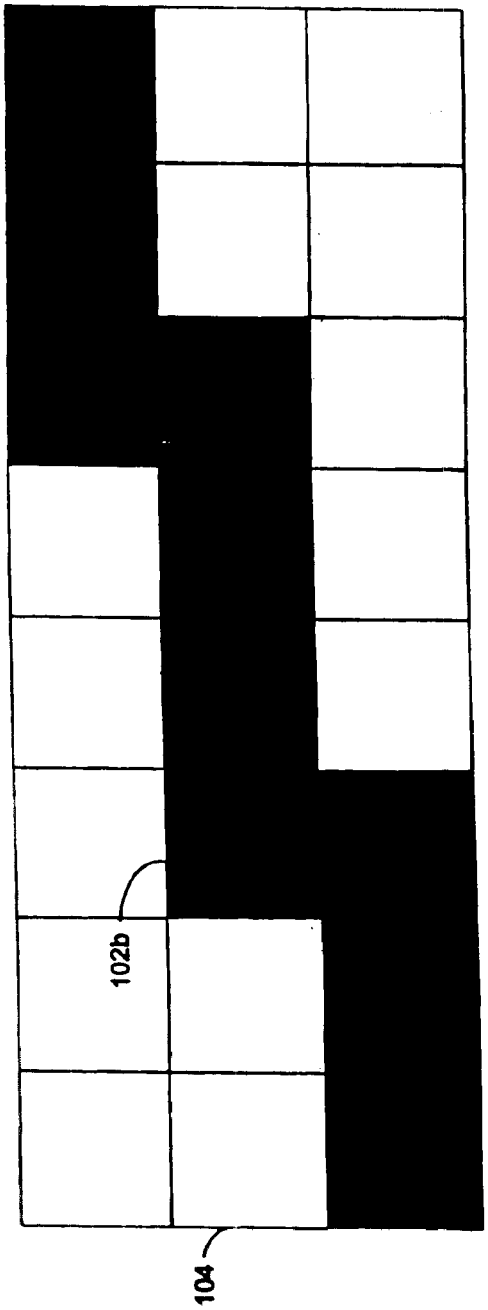
Figure 2:
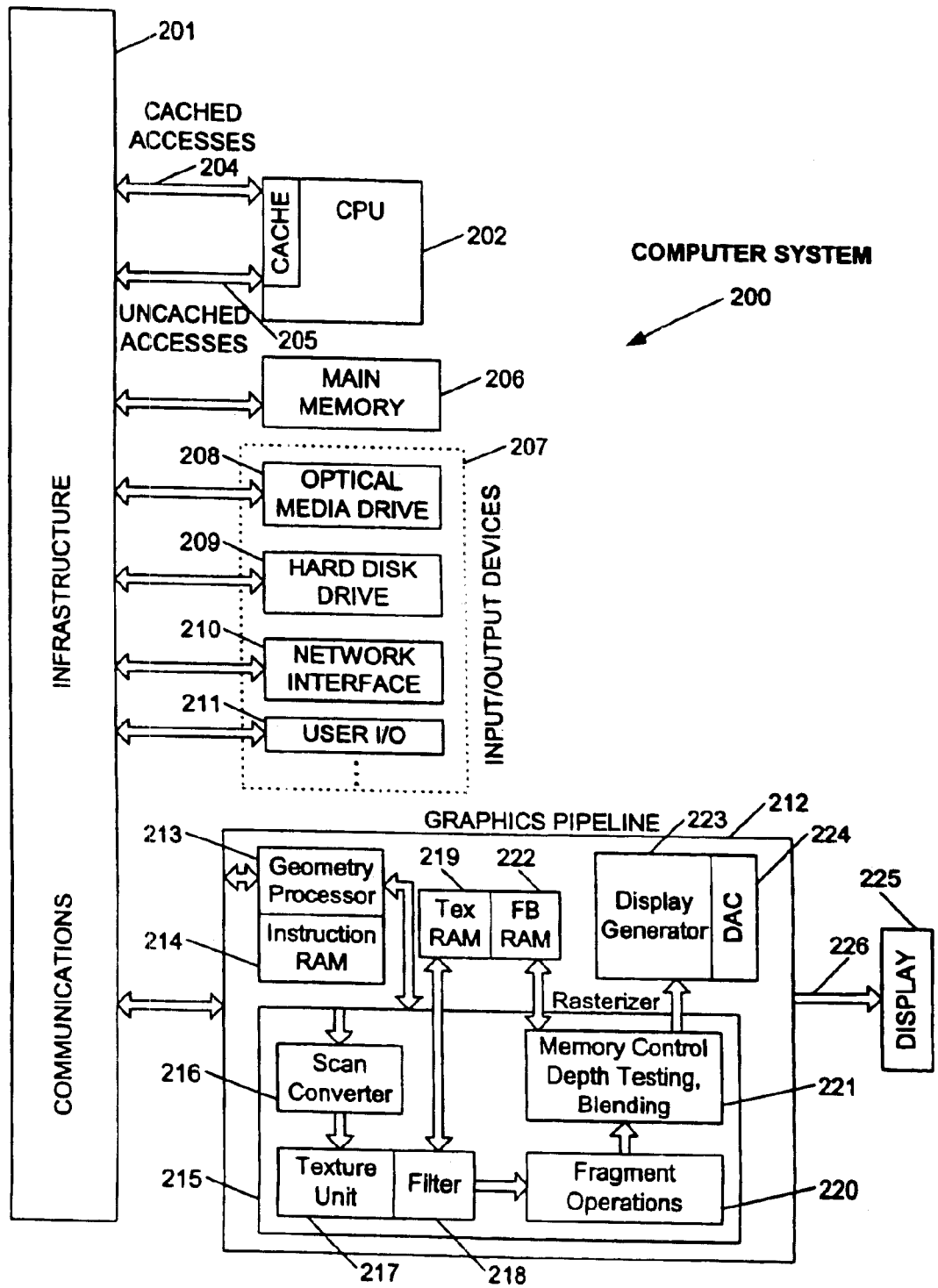
FIG. 2 illustrates a system equipped with a three-dimensional graphics pipeline suitable for use with the present invention.

FIG. 2 depicts an example of a computer system 200 equipped with a three-dimensional graphics pipeline 212 suitable for use with the present invention. The graphics pipeline is one embodiment of a three-dimensional renderer or a real-time three-dimensional renderer. Computer system 200 may be used to render all or part of a scene mapped in accordance with the present invention. This example computer system is illustrative of the context of the present invention and is not intended to limit the present invention. Computer system 200 is representative of both single and multi-processor computers.

Computer system 200 includes one or more central processing units (CPU), such as CPU 202, and one or more graphics subsystems, such as graphics pipeline 212. One or more CPUs 202 and one or more graphics pipelines 212 can execute software and/or hardware instructions to implement the graphics functionality described herein. Graphics pipeline 212 can be implemented, for example, on a single chip, as part of CPU 202, or on one or more separate chips. Each CPU 202 is connected to a communications infrastructure 201, e.g., a communications bus, crossbar, network, etc. Those of skill in the art will appreciate after reading the instant description that the present invention can be implemented on a variety of computer systems and architectures other than those described herein.

Computer system 200 also includes a main memory 206, such as random access memory (RAM), and can also include input/output (I/O) devices 207. I/O devices 207 may include, for example, an optical media (such as DVD) drive 208, a hard disk drive 209, a network interface 210, and a user I/O interface 211. As will be appreciated, optical media drive 208 and hard disk drive 209 include computer usable storage media having stored therein computer software and/or data. Software and data may also be transferred over a network to computer system 200 via network interface 210.

In one embodiment, graphics pipeline 212 indudes frame buffer 222, which stores images to be displayed on display 225. Graphics pipeline 212 also includes a geometry processor 213 with its associated instruction memory 214. In one embodiment, instruction memory 214 is RAM. The graphics pipeline 212 also includes rasterizer 215, which is communicatively coupled to geometry processor 213, frame buffer 222, texture memory 219 and display generator 223. Rasterizer 215 includes a scan converter 216, a texture unit 217, which includes texture filter 218, fragment operations unit 220, and a memory control unit (which also performs depth testing and blending) 221. Graphics pipeline 212 also includes display generator 223 and digital to analog converter (DAC) 224, which produces analog video output 226 for display 225. Digital displays, such as flat panel screens can use digital output, bypassing DAC 224. Again, this example graphics pipeline is illustrative of the context of the present invention and not intended to limit the present invention.

The present invention, when applied to specific objects within a scene, reduces aliasing, as perceived by the viewer. Different objects with different visual characteristics may use different antialiasing techniques and/or different antialasing parameters. Additionally, a single object may use different antialiasing techniques or parameters when viewed at different distances, angles, etc., or may use both techniques together in a single object. In addition, the present invention can complement and enhance other full scene antialiasing techniques to increase target detection and reduce aliasing artifacts on certain objects.

Two antialiasing techniques are presented: a general-purpose technique applicable to most objects, and a special-purpose antialiasing technique suitable for long, thin objects resembling runway lines. Because aliasing depends largely upon perceptual factors, the choice of which technique to use is preferably made by a scene designer or other person.

Figure 3:
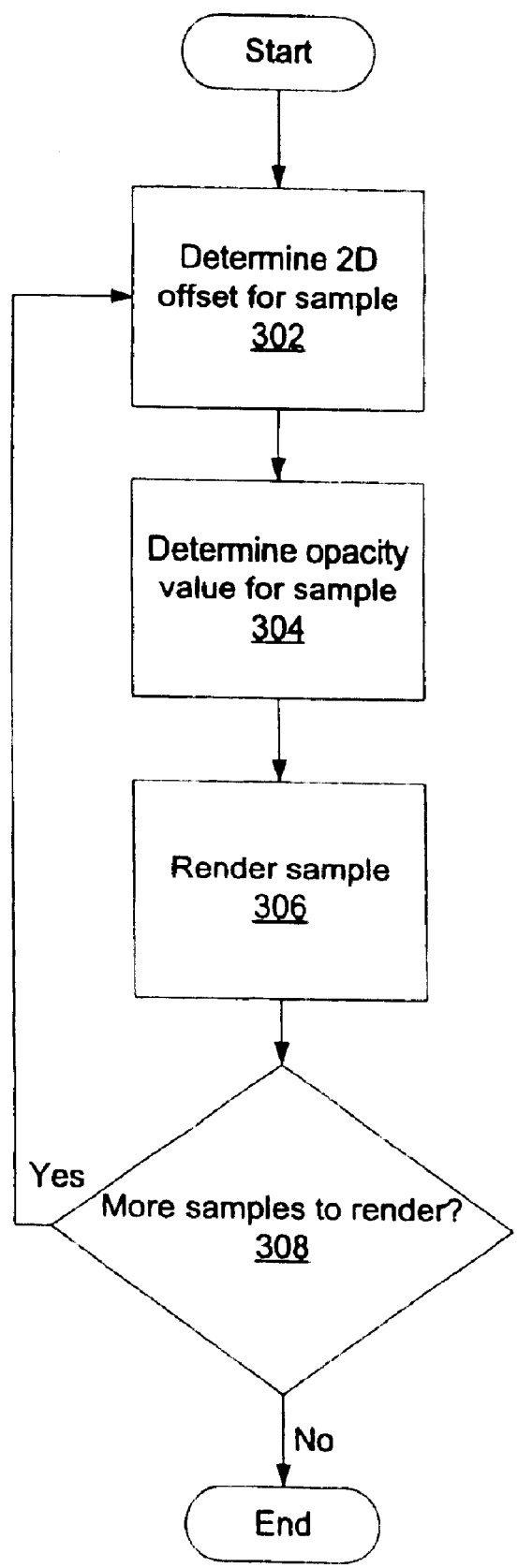
FIG. 3 is a flowchart illustrating a method for rendering samples of an object in accordance with an embodiment of the present invention.

FIG. 3 illustrates a method for rendering an object with the first, more general technique. For any object to be rendered using this technique, the following parameters may be specified by the database designer: number of samples (how many times to render the object), jitter radius (how much to displace each rendered copy in screen coordinates), minimnum opacity (value to which the applied transparency for each copy is clamped), and distance coefficients (that are used to determine how the opacity changes with distance). For each object antialiased using the general technique, loop 302–306 is executed once per sample. A 2D offset (in pixels) is determined 302 for the sample. The determination of the offset is described further below with reference to FIG. 4. Next, an opacity value is determined 304. The determination of an opacity value is described further below with reference to FIG. 5. Finally, the sample is rendered 306 for the current pass (sample) with the appropriate offset and opacity. If there are more samples to render 308, the process is repeated.

Figure 4:
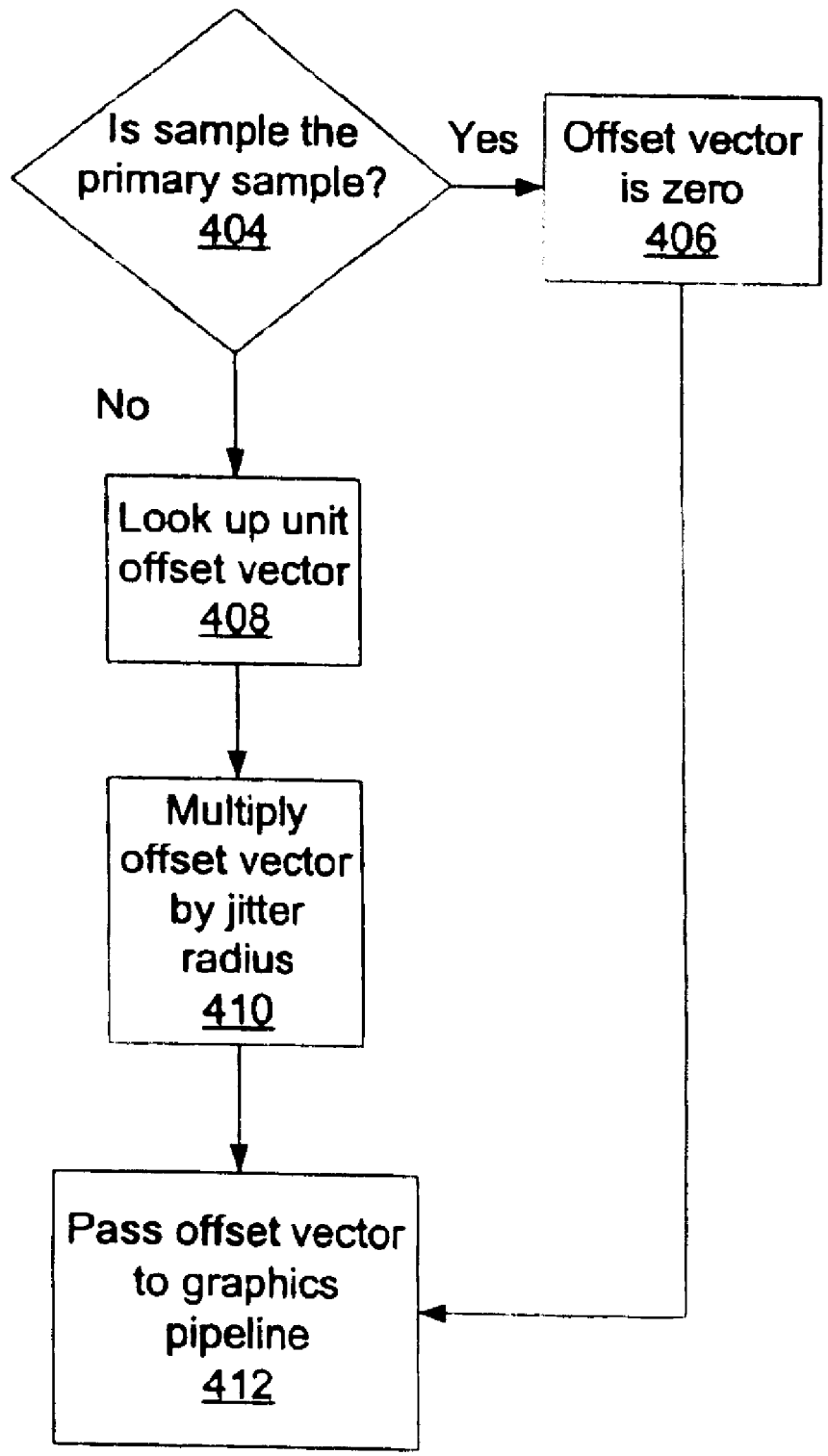
FIG. 4 illustrates a method for determining a two-dimensional offset vector, in accordance with an embodiment of the present invention.

Refering now to FIG. 4, there is shown an illustration of steps for determining a 2D offset for a sample. If this sample is 404 the primary sample (sample 0), the offset is 406 zero. Otherwise, a unit offset vector is looked up 408 in a table according to the sample number and is then multiplied 410 by the jitter radius. This offset vector is used to offset the geometry in the screen-space XY plane. In a preferred embodiment, the offset vector is passed 412 to the graphics pipeline as a separate 2D vector, but it could also be implemented using the modelview or projection matrices, which are the 4×4 transformation matrices that apply the camera view direction and perspective projection respectively to the object world space coordinates. If the modelview matrix is to be used, the transformation applied is equal to the screen-space offset transformed by the inverse modelview matrix, since the displacement occurs in screen aligned coordinates.

Figure 5:
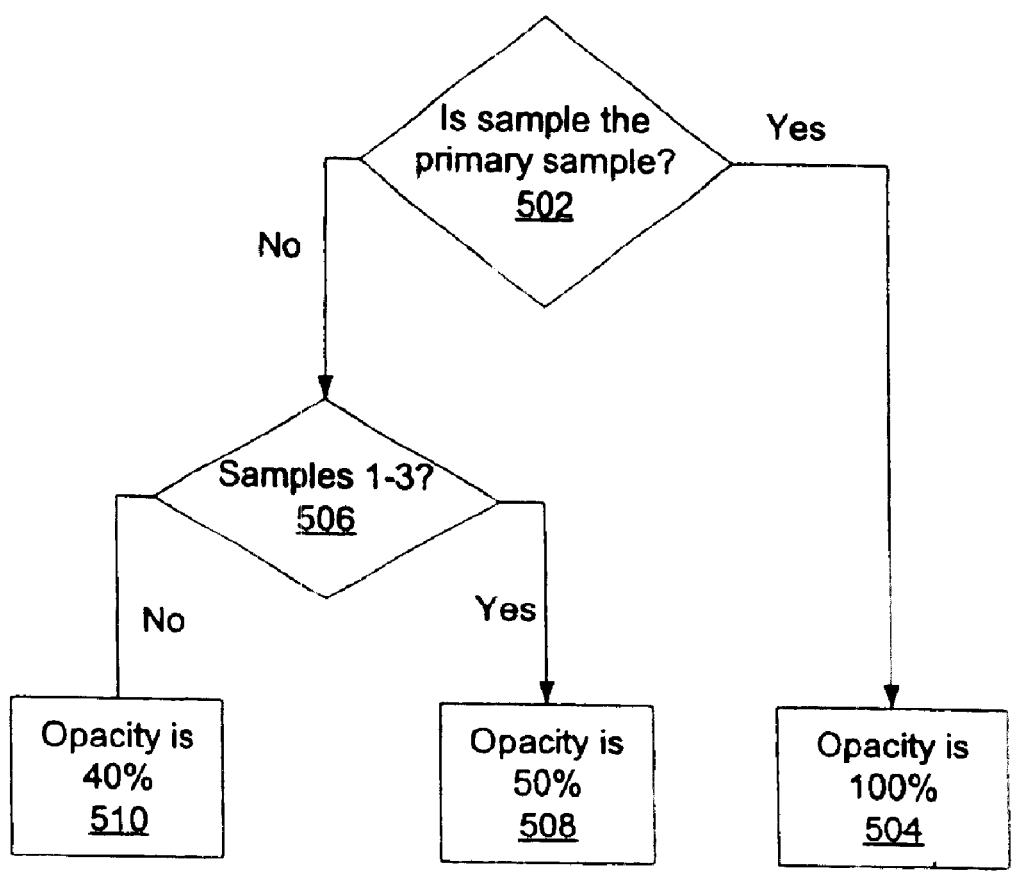
FIG. 5 illustrates a method for determining an opacity value for a sample, in accordance with an embodiment of the present invention.

Referring now to FIG. 5, there are shown the steps taken to determine an opacity value for the sample. If the sample is the primary sample 502, the opacity is 100% 504. Otherwise, the opacity is less. In one embodiment, for example, samples 1–3 506 are 50% opaque 508, and samples 4 upward are 40% opaque 510. The specific opacity values are preferably determined according to a desired opacity falloff curve to be applied to the object edges, chosen empirically to minimize rendering artifacts and provided in a table with sample opacity values. Parameters such as the number of samples and the opacity are preferably specified in the file describing each object to which per-object antialiasing is applied. These parameters are chosen according to how critical the object in question is, and by observing the object in the synthetic environment it is placed. The opacity is then used to as a coefficient in the opacity equation below.

Next, the object is rendered 306 for the current pass (sample). During rendering, the actual opacity for the object is determined according to the following equation in a preferred embodiment:

$$A_i = \max(O_i * (Z_e * C_1 + C_0), O_1 * O_{min})$$

where A is the determined Alpha, $O_i$ is the sample opacity from step 304, $O_{min}$ is the user-specified minimum opacity, $Z_e$ is the eye-space Z of the object or vertex, and $C_0$, $C_1$ are the user-specified depth coefficients that define a linear equation for how the opacity falls off with distance. This equation may be evaluated per-object using the CPU 202, per-vertex using a dedicated functional unit within the graphics pipeline, or, in a preferred embodiment, per-vertex using microcode executed by a geometry processor 213 contained within the graphics subsystem 212.

Specifying coefficients $C_0$ and $C_1$ directly may not be desirable, as they have no direct physical meaning. In a preferred embodiment, the user may specify $Z_{opaque}$ and $Z_{transparent}$, points where the object is fully opaque and fully transparent (prior to the max operation), which may be used to define the line expressed as $C_0$ and $C_1$. $C_0$ and $C_1$ are therefore determined as follows:

$$C0 = Z_{transparent} / (Z_{transparent} - Z_{opaque})$$

$$C1 = 1 / (Z_{transparent} - Z_{opaque})$$

In a preferred embodiment, the object samples are rendered in order of increasing opacity, with the most transparent object rendered first and the fully opaque object rendered last, in order to ensure that the outline of the object is antialiased properly but the interior is not blurred by the transparent copies of the object. Because of this, the primary sample is rendered mostly opaque and last, and the rest of the samples are rendered more transparent and before the primary sample.

In addition, writing into the depth buffer is preferably disabled for all of the samples but the primary one, in order to avoid depth buffering artifacts. The artifacts may arise from the rendering offsets applied to the object, affecting the actual pixel depth values of the different offset object copies being rendered. For example, if an object covers certain pixels, and one of the offset-samples of the object covers additional pixels to provide a contrast-blending region, it is undesirable to allow those additional pixels to occlude subsequently rendered objects. Alternatively, objects in the scene could be sorted far to near, which may be computationally unfeasible.

Once all of the samples are rendered, rendering proceeds to the next object in the scene, which may or may not employ object antialiasing. When a scenegraph or other graphics framework using deferred rendering is employed, a display list is preferably created and then rendered following scene traversal. In this instance, the multipass rendering described above is preferably carried out by placing multiple instances of the object in the display list, with the offset and opacity settings also included for each pass.

Runway Lines

Figures 6A, 6B:
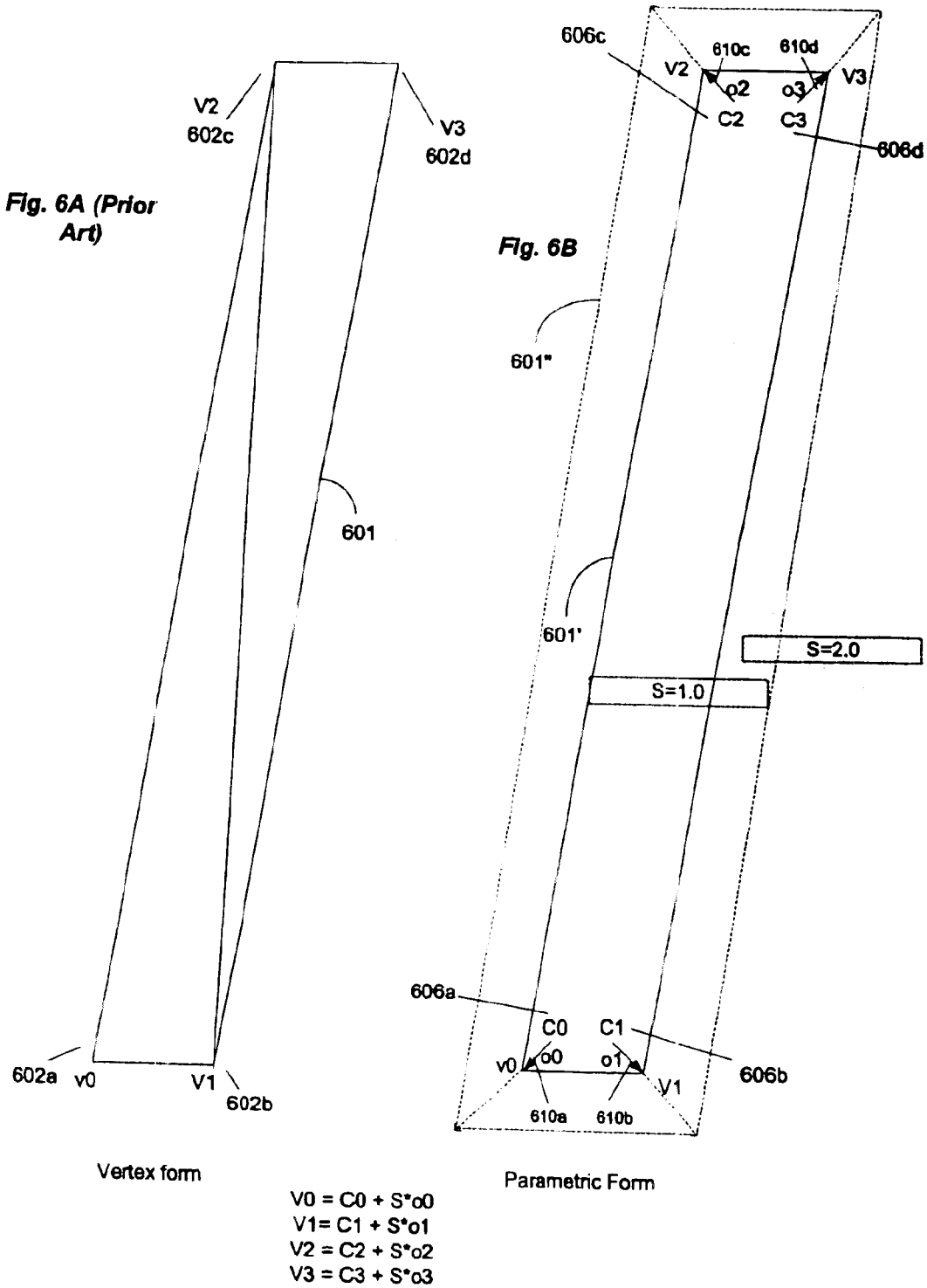
FIG. 6A illustrates a runway line modeled by a conventional 3D modeling package.
FIG. 6B illustrate a runway line modeled in accordance with an embodiment of the present invention.

Because of their singularly difficult aliasing behavior, runway lines and other high-contrast, long and then objects are antialiased using a technique different from that described above. The first step in the runway line antialiasing process occurs during creation of the scene database. FIG. 6A shows a runway line 601, as might be modeled using a 3D modeling package such as 3Dstudio by Discreet. Each vertex 602 preferably includes a position, texture coordinates, and a normal vector.

FIG. 6B shows the same line 601', but pre-processed such that every vertex position 602 is represented in a parametric form, with a vertex center position (such as '$c_0$') 606 and a per vertex offset (such as '$o_0$') 608. We can obtain the original vertex position 602 by adding the vertex center 606 and the vertex offset 608. But if the vertex offset 608 value is multiplied by a scaling factor, it is possible to recreate multiple versions of the original line with different 'growth'values—for scale factor values less than 1.0, the line will be thinner, than the original, and for scale factor values greater than 1.0, the line will be thicker. For example, in FIG. 6B, if a scale factor of 2.0 is used, line 601' is enlarged to become line 601".

Each vertex texture coordinate is not altered by the process, and since lines are usually flat, a single shared normal vector is preferably encoded for all of the vertices in an object without any detriment to lighting quality.

In a preferred embodiment, the offset vectors 608 are stored in the scene database as if they were normal vectors, which allows this non-standard data format to be passed through existing infrastructure and then interpreted as offset vectors 608 during rendering.

Runway line antialiasing is preferably controlled by two user parameters, specified by a scene database designer or other person. Those parameters are $K_{scale}$ and $K_{opacity}$. During rendering, these parameters, along with the eye space vertex distance d, and the vertex data described above are used to determine the rendered vertex positions and opacities. Vertex positions H02 are preferably determined as follows:

$$V=C+(1+K_{scale}*d)*O$$

where V is the final vertex position, C is the database vertex center, and O is the database vertex offset vector. Vertex opacities are preferably determined as follows:

$$A=A_0*1/(1+K_{opacity}*d)$$

where A is the final vertex opacity (alpha) and $A_0$ is the modeled vertex opacity (less than 1.0 if the object was partially transparent prior to application of antialiasing). V and A may be determined on CPU 202, using dedicated hardware functional units or, in a preferred embodiment, by microcode executed by the geometry processor 213 within the graphics subsystem 212.

The runway antialiasing technique described above reduces aliasing by growing the size of the objects as they become more distant, and also making them more transparent, which keeps the rendered intensity approximately constant, but reduces the contrast as they become more distant. The resulting image is consistent with the appearance of actual runway lines and aliases far less than runway lines rendered with other antialiasing techniques.

Both of the described antialiasing techniques enable per-object antialiasing, which is advantageous because it need only be applied to objects that are critical or exhibit the most objectionable aliasing. Also, the runway line antialiasing component of the present invention provides for antialiasing of long, thin objects in a way superior to existing techniques. Both techniques complement existing antialiasing techniques such as full-scene antialiasing, and indeed, they can be used in tandem in some embodiments.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component For example, the particular functions of the jitter alpha determination, runway Alpha determination, or the runway vertex offset determination, and so forth may be provided in many or one module. Also, vertex and alpha determinations may be implemented in a variety of modes, including a DSP, or any other device capable of arithmetic operations.

Some portions of above description present the feature of the present invention in terms of algorithms and symbolic representations of operations on information. These algorithmic descriptions and representations are the means used by those skilled in the graphics rendering arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for antialiasing objects in a scene database, each object having a three-dimensional distance from a viewer and including a plurality of primitives, the method comprising:

dispatching at least one sample of an object to a renderer;

determining a two-dimensional offset vector for the sample;

determining an opacity value for the sample, the opacity value associated with the three-dimensional distance of the object from the viewer; and rendering the object using the determined two-dimensional offset vector and the determined opacity value.

2. The method of claim 1, wherein each object has a plurality of vertices, each vertex having a three-dimensional distance from the viewer, and the step of determining the opacity value for the sample further comprises:

determining an opacity value for each vertex of the sample, each opacity value associated with the three-dimensional distance of the vertex from the viewer.

3. The method of claim 1, wherein determining the two-dimensional offset vector for the sample further comprises:

determining whether the sample is a primary sample;

responsive to the sample being the pi sample, setting the offset to zero;

responsive to the sample not being the primary sample:
   obtaining a unit offset vector for the sample; and
   multiplying the unit offset vector by a jitter radius of the object.

4. The method of claim 1, wherein determining the opacity value for the sample further comprises:

determining whether the sample is a primary sample;

responsive to the sample being the primary sample, setting the opacity to a first opacity value; and responsive to the sample not being the primary sample, setting the opacity to a second opacity value, wherein the second opacity value is less than the first opacity value.

5. The method of claim 4, wherein the first opacity value is 300 percent.

6. A method for antialiasing an object in a three-dimensional computer graphics system, the object including a plurality of vertices, each vertex including a position, the method comprising:

in a scene database, representing each vertex position by a sum of a per-vertex center vector and a per-vertex offset vector;

for each vertex, determining a scale factor and an opacity value associated with a view distance; and rendering the object according to the scale factors and opacity values.

7. The method of claim 6 wherein the scale factor and the opacity value are further determined in accordance with an angle of incidence of a view vector to the object.

8. A computer program product for antialasing objects in a scene database, each object having a three-dimensional distance from a viewer and including a plurality of primitives, the computer program product stored on a computer-readable medium and including instructions configured to cause a processor of a computer to execute the steps of:

dispatching at least one sample of an object to a renderer;

determining a two-dimensional offset vector for the sample;

determining an opacity value for the sample, the opacity value associated with the three-dimensional distance of the object from the viewer; and rendering the object using the determined two-dimensional offset vector and the determined opacity value.

* * * * *

UNITED STATES PATENT AND TRADEMARK OFFICE
CERTIFICATE OF CORRECTION

PATENT NO. : 6,906,729 B1
DATED : June 14, 2005
INVENTOR(S) : Ignacio Sanz-Pastor et al.

It is certified that error appears in the above-identified patent and that said Letters Patent is hereby corrected as shown below:

Title page,
Item [57], ABSTRACT,
Line 1, change "Object" to -- Objects --.
Line 7, change "copys" to -- copy --.
Line 13, after "line" add -- cables. --.

Column 10,
Line 8, change "pi" to -- primary --.
Line 24, change "300" to -- 100 --.

Signed and Sealed this

Eighth Day of November, 2005

JON W. DUDAS
*Director of the United States Patent and Trademark Office*